United States Patent [19]
Abe et al.

[11] Patent Number: 5,573,662
[45] Date of Patent: Nov. 12, 1996

[54] APPARATUS FOR TREATMENT OF LOW-CONCENTRATION ORGANIC WASTE WATER

[75] Inventors: Mitsugu Abe, Hadano; Senri Ojima, Sendai, both of Japan

[73] Assignee: Nomura Micro Science Co., Ltd., Kanagawa-ken, Japan

[21] Appl. No.: 302,462

[22] Filed: Sep. 12, 1994

[30] Foreign Application Priority Data

Sep. 13, 1993 [JP] Japan .................................... 5-227184

[51] Int. Cl.⁶ ................................ C02F 1/42; C02F 1/72; C02F 3/02
[52] U.S. Cl. ........................ 210/188; 210/192; 210/266; 210/259; 210/900
[58] Field of Search .................................... 210/900, 750, 210/188, 664, 748, 266, 259, 192, 638, 652

[56] References Cited

U.S. PATENT DOCUMENTS

| | | | |
|---|---|---|---|
| 3,870,033 | 3/1975 | Faylor et al. | 210/900 |
| 4,698,153 | 10/1987 | Matsuzaki et al. | 210/900 |
| 5,073,268 | 12/1991 | Saito et al. | 210/638 |
| 5,124,033 | 6/1992 | Ohmi et al. | 210/900 |
| 5,160,429 | 11/1992 | Ohmi et al. | 210/900 |
| 5,180,403 | 1/1993 | Kogure | 55/53 |
| 5,190,627 | 3/1993 | Saito et al. | 210/748 |
| 5,385,664 | 1/1995 | Oinuma et al. | 210/900 |
| 5,422,013 | 6/1995 | Hirofuji | 210/900 |

OTHER PUBLICATIONS

Arthur J. Ackerman, and Russ W. Dahmer, Microcontamination 92 Conference Proceeding, "*Ultra Pure Water System Design To Meet Semi Conductor Manufacturing Requirements*". pp. 729–738; Oct., 1992; Best Available Technology to Meet Current Semi Conductor Manufacturing Requirements, p. 736.

*Primary Examiner*—Cynthia L. Nessler
*Attorney, Agent, or Firm*—Henderson & Sturm

[57] ABSTRACT

An apparatus for the treatment of a low-concentration organic waste water for relaim a low-concentration organic waste water having a TOC concentration of from 0.5 to 3 ppm and obtaining an ultra pure water having a TOC concentration of not more than 1 ppb is characterized by the fact that a first treating system comprising a reverse osmosis unit for transforming a low-concentration organic waste water having a TOC concentration of from 0.5 to 3 ppm into a low-concentration organic waste water having a TOC concentration of from 60 to 200 ppb and a vacuum degasifier adapted to admit an inert gas at a volumetric feed flow rate in the range of from 0.001 to 1.0 based on the volume of the waste water under treatment at a vacuum rate of not more than 35 Torrs and a second treating system comprising a low-pressure ultraviolet decomposition unit for emitting an ultraviolet light of a wavelength of 184.9 nm and an ion-exchange column are disposed along the flow path of the waste water sequentially in the order mentioned. This apparatus operates with a reduction in both initial cost and running cost because it uses a vacuum degasifier of low running cost with high efficiency and also uses a low-pressure ultraviolet irradiating unit which costs less than the high-pressure ultraviolet irradiating unit, requires no large space for installation, and manifests high efficiency of TOC decomposition. It is easy to manage as compared with the apparatus which is operated by a method resorting to an aerobic microorganism.

9 Claims, 1 Drawing Sheet

APPARATUS FOR TREATMENT OF LOW-CONCENTRATION ORGANIC WASTE WATER

BACKGROUND OF THE INVENTION

1. Field of the Invention

This invention relates to an apparatus for the treatment of a low-concentration organic waste water, which in a system for recovering ultra pure water for use in the production of semiconductor devices, for example, renders the low-concentration organic waste water originating in the point of use and having a TOC (total organic carbon) concentration of the order of ppm reusable for the production by divesting the waste water of its organic content until a TOC concentration of not more than 1 ppb.

2. Description of the Related Arts

Heretofore, in the process of production of semiconductor devices, ultra pure water has been used in large volumes for washing semiconductor wafers. The low-concentration waste water arising from the point of use is subjected to a reclaim treatment in a recovery system for the purpose of reuse.

The waste water from the point of use entrains volatile organic compounds such as those cited below, for example, on the order of ppm. For reuse in the process of production of semiconductor devices, this waste water must be purified to a TOC concentration of not more than 1 ppb.

| | |
|---|---|
| Isopropanol | 1120.1 ppb |
| 1,1-Dichloroethylene | 0.3 ppb |
| Cis-1,2-dichloroethylene | 9.1 ppb |
| Chloroform | 0.4 ppb |
| Trichloroethylene | 14.5 ppb |
| Bromodichloromethane | 0.2 ppb |
| Tetrachloroethylene | 0.5 ppb |
| Dibromochloromethylene | 0.3 ppb |

The large volume of isopropanol content among other TOC contents in the waste water is because the vapor of isopropanol is used for drying the washed semiconductor wafers.

Heretofore, treatment of the low-concentration organic waste water, utilized a high-pressure ultraviolet lamp for decomposing by oxidation the TOC in the waste water. This method comprised adding hydrogen peroxide to the waste water containing TOC and irradiating the waste water with an ultraviolet light having main wavelengths of 365 nm 253.7 nm and emitted from the high-pressure ultraviolet lamp thereby decomposing the TOC in the waste water by oxidation. The inorganic carbon and organic acids arising from the decomposition of TOC and the excess hydrogen peroxide remaining after the treatment are then removed by an activated carbon column, an ion-exchange resin column, and a reverse osmosis unit.

However, the high-pressure ultraviolet lamp used for this method is expensive. Furthermore, decomposition is enefficient in regards to the amount of electric power consumed, resulting in an unduly long time spent for the irradiation. Also, the tank used for the treatment requires a large capacity and occupies a large space. Further, since a fairly large part of the electric power consumed is transformed into heat energy, the treatment under consideration entails copious generation of heat energy thereby boosting the running costs. If the flow of the waste water stops, the possibility may ensue that the heat will quickly raise the temperature of the waste water in the tank and set the waste water boiling. An additional disadvantage is the activated carbon column tends to induce propagation of contaminants. The method which treats the low-concentration organic waste water with the conventional apparatus for producing ultra pure water by the use of the high-pressure ultraviolet lamp, therefore, incurs the problem of entailing a high initial cost and a high running cost.

As a way of treating the low-concentration organic waste water without recourse to a high-pressure ultraviolet lamp, the method which biologically implements the decomposition of the TOC in the waste water under treatment by passing the waste water through a treating column having aerobic microorganisms propagated therein has been known. This method, however, encounters the problem of demanding very exacting management of equipment because its treating ability is susceptible to serious impairment when contaminants enter the treating column.

Further, MICROCONTAMINATION 92 Conference Proceedings, October, Santa Clara, pp. 729–738 discloses at page 736 what is titled "BEST AVAILABLE TECHNOLOGY TO MEET CURRENT SEMICONDUCTOR MANUFACTURING REQUIREMENT." By the system illustrated therein, a given raw water is transformed into extremely purified water by treatments using many unit devices such as a reverse osmosis unit, a degasifier, an ultraviolet irradiating unit, and an ion-exchange resin column.

This system, however, must use many unit devices and has never been reviewed from the standpoint of decreasing the number of indispensable unit devices to the fullest possible extent.

SUMMARY OF THE INVENTION

As described above, however, the conventional method which effects the decomposition of the TOC in the waste water by adding hydrogen peroxide to the waste water and irradiating the waste water with an ultraviolet light having a main wavelength of 365 nm and which then effects the removal of the inorganic carbon and organic acids arising from the decomposition of TOC by means of the adsorption using an activated carbon column, an ion-exchange resin column, and a reverse osmosis unit has various drawbacks in that the high-pressure ultraviolet lamp is unduly expensive and inefficient in decomposing in terms of the amount of electric power consumed because the organic compounds are decomposed substantially until inorganic carbon, that the treatment requires an unduly long time for the irradiation and the treating column requires a large capacity and occupies a large space, and that the waste water under treatment emits a large amount of heat because a large part of the consumed electric power is transformed into heat and, if the flow of the waste water is stopped, the waste water will be quickly heated possibly to the point of boiling.

The method which biologically attains the decomposition of the TOC in the waste water under treatment by passing the waste water through the treating column which has aerobic microorganisms propagated therein, has the problem that the treating column calls for very exacting management of equipment because contaminants easily enter the treating column and, on gaining entrance therein, seriously degrade the treating ability of the treating column.

Further, since the reverse osmosis unit requires the reverse osmosis module to be replaced with a new supply after expiration of its service life and the ion-exchange resin column requires the ion-exchange resin to be regenerated after exhaustion of its ion-exchange capacity, the treatment calls for a high initial cost and a high running cost and the treating column inevitably occupies a large space. Though the deaeration column does not require a very high running cost, it is still at a disadvantage in obtaining the removal of TOC with unduly low efficiency.

The first object of this invention, therefore, is to provide an apparatus for the treatment of a low-concentration organic waste water which is enabled to operate stably at a low initial cost and a low running cost, obviate the necessity for a large space, and ensure easy management by using a vacuum degasifier under conditions for highly efficient removal of TOC, adopting a low-pressure ultraviolet irradiation unit in the place of a high-pressure ultraviolet lamp, and decreasing the number of unit devices to be used in addition to the vacuum degasifier column to the fullest possible extent.

The second object of the present invention is to provide an apparatus which comprises a plurality of stages each of a combination of a low-pressure ultraviolet irradiating unit with an ion-exchange column and allow the apparatus to operate at a low initial cost and a low running cost by effecting the removal of organic compounds from the waste water in the form of organic acids by the use of the former stage of combination and then effecting the removal of the organic compounds remaining after the removal by the use of the former stage of combination as converted into organic acids and inorganic carbon by the use of the latter stage of combination.

Specifically, the apparatus of this invention for the treatment of a low-concentration organic waste water serves the purpose of regenerating a low-concentration organic waste water having a TOC concentration of from 0.5 to 3 ppm and obtaining an ultra pure water having a TOC concentration of not more than 1 ppb. This apparatus is characterized by a first treating system comprising a reverse osmosis unit for transforming a low-concentration organic waste water having a TOC concentration of from 0.5 to 3 ppm, into a low-concentration organic waste water having a TOC concentration of from 60 to 100 ppb, and a vacuum degasifier adapted to admit an inert gas at a volumetric feed flow rate in the range of from 0.001 to 1.0, based on the volume of the waste water under treatment at a vacuum rate of not more than 35 Torrs. This apparatus is also characterized by a second treating system comprising a low-pressure ultraviolet decomposition device for emitting an ultraviolet light of a wavelength of 184.9 nm and an ion-exchange device. Both treating systems are disposed along the flow path of the waste water sequentially in the order mentioned.

The low-concentration organic waste water to be treated by this invention has a TOC concentration of 0.5 to 3 ppm, but generally not more than 1 ppm.

As a reverse osmosis unit suitably usable for this invention, such commercial manufactures as "SU-700" (produced by Toray Industries, Inc.) and "NTR-759UP" (produced by Nitto Electric Industrial Co., Ltd.) may be cited. Particularly when two or more stage reverse osmosis units are used in series connection, it is advantageous to use at the final stage of the series such a module as "NTR-759UP" which manifests a high capacity for the removal of a low-concentration TOC. The reverse osmosis unit of this kind is manufactured by preparing composite sheets having reverse osmosis membranes deposited one each on the opposite surfaces of a mesh spacer and winding these composite sheets on a center pipe of a perforated wall through the medium of a mesh spacer. In the reverse osmosis unit, the water in the waste water flowing between the adjacent composite sheets is purified while diffusing through the reverse osmosis membranes and is advanced through the interior of the center pipe to the next step and meanwhile the concentrated waste water is allowed to continue its flow between the adjacent composite sheets until it is discharged from the device. The TOC concentration in the outlet water from the reverse osmosis unit, namely the inlet water to the vacuum degasifier, has a large effect on the efficiency of TOC removal by the vacuum degasifier. For example, the TOC rejection by the vacuum degasifier which is about 6% when the TOC concentration at the inlet to the vacuum degasifier is 1 ppm increases past 20% when the TOC concentration at the inlet is below 200 ppb (under the operating conditions of the vacuum degasifier at a $N_2$ liquid gas ratio of 3%, water temperature 30° C, and vacuum rate 30 Torrs).

From this point of view, this invention contemplates relying on the reverse osmosis unit to treat the low-concentration organic waste water having a TOC concentration of from 0.5 to 3 ppm so as to lower the TOC concentration to a level of from 60 to 200 ppb in consequence of the removal of organic compounds.

The results of an experiment conducted by the inventors indicate that since the ratio of removal is unduly low and the load on the secondtreating system is unduly large when the TOC concentration at the inlet to the vacuum degasifier exceeds 200 ppb, it is desirable to have the reverse osmosis unit so set in place that the TOC concentration at the inlet may fall below 200 ppb. Where the load on the second treating apparatus is required to be lessened further, the TOC concentration is desired to be below 100 ppb. The TOC concentration at the inlet to the degasifier is desired to be not less than 60 ppb because the ratio of TOC removal by the degasifier is rather degraded than otherwise when the TOC concentration falls short of 60 ppb. When the waste water happens to have a TOC concentration of from 1 to 3 ppm, it is desirable to use at least two stage low-pressure reverse osmosis units.

For use in the present invention, the vacuum degasifier which is disclosed in U.S. Pat. No. 5,180,403 proves to be an ideal example. This unit can improve the efficiency of deaeration notably by continuing deaeration to below 35 Torrs while simultaneously admitting therein an inert gas such as, for example, nitrogen gas at a volumetric feed flow rate of from 0.001 to 1.0, preferably from 0.01 to 0.05, based on the volume of the waste water under treatment.

In this invention, the overall efficiency of TOC removal is improved in proportionas the TOC concentration at the outlet from the first treating system is lowered. For the purpose of lowering the TOC concentration at the outlet from the first treating system, it suffices to heighten the ratios of TOC removal by the reverse osmosis unit and the vacuum degasifier. The elevation of the ratio of TOC removal by the reverse osmosis unit requires installation of a plurality of reverse osmosis units at different stages and entails additions to the initial cost and the running cost. For the purpose of repressing the rise of cost to the fullest possible extent, therefore, it is desirable to heighten the ratio of removal by the vacuum degasifier.

The low-pressure ultraviolet irradiating unit to be used in this invention proves to operate advantageously when the lamp proper and the outer tube thereof are made of a material pervious to such ultraviolet lights which have a short wavelength of 184.9 nm with a high energy in addition to a main wavelength of 253.7 nm so that the device may utilize these ultraviolet lights. The ultraviolet light of the wavelength of 184.9 nm directly produces from the water molecules the OH radicals which act to decompose the TOC into organic acids and inorganic carbon. The low-pressure ultraviolet lamp has a small amount of energy (amount of electric power consumption) associated with the efficiency of TOC decomposition (from 1/30 to 1/40 of the power consumption by the high-pressure ultraviolet lamp) and, therefore, emits heat energy only in a small amount and has no possibility of boiling the feed water even when the flow of the feed water is stopped.

In the second treating system, the organic acids and other ionic substances which have been produced in consequence of the decomposition of TOC by the low-pressure ultraviolet light irradiating unit are removed by the ion-exchange column. When a plurality of low-pressure ultraviolet irradiating units are used as connected in series, the manner of their connection with the ion-exchange column has an effect on the percentage of TOC removal.

According to the experiment performed by the inventors for the purpose of verifying what is described above, the system having two low-pressure ultraviolet irradiating units and two ion-exchange column alternately arranged and connected in series shows about 1.5 times the efficiency of TOC removal obtainable by the system having one ion-exchange column disposed behind two interconnected low-pressure ultraviolet irradiating units.

where a plurality of low-pressure ultraviolet irradiating units are to be used as disposed at different stages, therefore, it is more advantageous for the sake of exalting the percentage of removal to adopt a configuration having low-pressure ultraviolet irradiating units and ion-exchange columns arranged alternately.

Particularly, the low-pressure ultraviolet irradiating units transform organic compounds substantially wholly into organic acids and the subsequent ion-exchange columns remove these organic acids. Where two low-pressure ultraviolet irradiating units and two ion-exchange columns are used as alternately arranged and connected in series, the low-pressure ultraviolet irradiating unit in the latter stage enables the organic compounds which have escaped the decomposition in the former stage to be decomposed into organic acids and inorganic carbon gas and the subsequent ion-exchange column removes the organic acids resulting from the decomposition just mentioned.

The low-pressure ultraviolet irradiating unit manifests higher efficiency than the high-pressure ultraviolet irradiating unit because the former device is so adapted as to cause the organic compounds to be partly decomposed until becoming organic acids instead of being wholly decomposed thoroughly until becoming inorganic carbon gas and the ion-exchange column is relied on to decompose the organic acids.

In various ion-exchange units, a regeneration or a non-regeneration type mixed-bed ion-exchange unit using a mixture of a strongly basic ion-exchange resin with a strongly acidic ion-exchange resin proves to be particularly suitable. Though the use of this particular ion-exchange unit is desirable, it is not critical for the execution of this invention. What is essential here is that the ion-exchange unit to be used should be capable of removing ionic substances which are generated by the low-pressure ultraviolet irradiating unit.

The apparatus according to this invention allows removal of organic compounds from a low-concentration organic waste water having a TOC concentration of not less than 1 ppm to the extent of lowering the TOC concentration to not more than 1 ppb.

This apparatus can be operated at a reduction in both initial cost and running cost because it uses a degasifier incapable of producing any secondary waste and also uses a low-pressure ultraviolet irradiating unit which costs less than the high-pressure ultraviolet irradiating unit, requires no wide space for installation, and manifests a high efficiency of TOC decomposition.

Further, this apparatus is easy to manage as compared with an apparatus which is operated by a method resorting to an aerobic microorganism.

DESCRIPTION OF THE PREFERRED EMBODIMENTS

Figure 1:
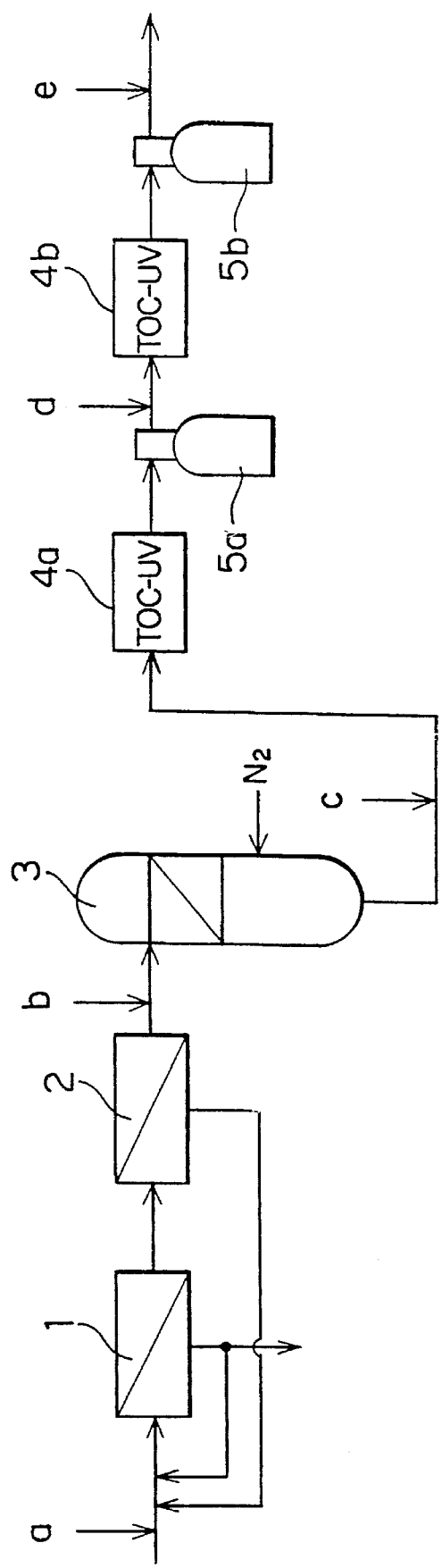
FIGURE 1 illustrates the construction of this invention.

FIGURE 1 is a diagram illustrating the construction of one embodiment of this invention.

The first treating system of this embodiment is constructed by connecting a reverse osmosis unit [(product of Toray Industries, Inc. marketed under product code of SU-710) × 12] 1, a reverse osmosis unit [(product of Nitto Electric Industrial Co., Ltd. marketed under product code of NTR-759. UP) × 9) 2, and a gas-injection type vacuum degasifier (250 mm in diameter and 2 min packed bed height) 3. The ratio of $N_2$ to the feed water under treatment in the vacuum unit is 0.03:1.

The second treating system is constructed by connecting a low-pressure ultraviolet irradiating unit [(product of Chiyoda Kohan K. K. (provided with an electron stabilizer) marketed under product code of TDFL-4, rated for 184.9-nm dosage of 0.5 kW.h/m$^3$] 4a, a mixed-bed type ion-exchange column 5a, a low-pressure ultraviolet irradiating unit 4b of the same specification as mentioned above, and a mixed-bed type ion-exchange column 5b.

Further, for the sake of decreasing the amount of the feed water from the reverse osmosis unit, part of the concentrated water from the second-stage reverse osmosis unit is returned to the inlet side of the reverse osmosis unit and utilized for improving the ratio of recovery.

The apparatus of the present embodiment described above was used to treat a sample organic waste water prepared by adding isopropanol to extremely pure water (TOC concentration from 0.22 to 0.23 mgC/l, specific resistivity 17.0 MΩ•cm, and water temperature 25° C) until reaching a TOC concentration of about 1 ppm.

With reference to the construction illustrated in the diagram, the flow rate at the position of the inlet pipe (a) was 1.7 m$^3$/h, the flow rate at the positions of the pipes (b) to (e) was 1.5 m$^3$/hr, the flow rate inside the vacuum degasifier 4 was LV=30 [m/h], and the flow rate inside the mixed-bed type ion-exchange columns 5a and 5b was LV=40 [m/h].

The results of this treatment were as shown in the following table.

It is clearly noted from this table that the treatment notably lowered the TOC concentration of the sample organic waste water as evinced by the TOC concentration at the outlet of the apparatus which was less than 1 ppb.

TABLE

| | Position in diagram | TOC [ppb] | Rejection [%] |
|---|---|---|---|
| Sample waste water | a | $1.1 \times 10^3$ | — |
| Outlet of 2nd R/O | b | 80 | 92.7 |
| Outlet of vacuum degasifier | c | 60 | 25.0 |
| TOC – UV + MB 1st | d | 11 | 81.7 |
| TOC – UV + MB 2st | e | 0.6–0.8 | 93.6 |

It is clearly noted from the table that the treatment notably lowered the TOC concentration of the sample organic waste water as evinced by the fact that the TOC concentration at the outlet of the apparatus was less than 1 ppb. The treated sample was so pure as to warrant reuse thereof as washing water.

What is claimed is:

1. An apparatus for the treatment of a low-concentration organic effluent, the apparatus regenerating a low-concentration organic effluent used in a process of production of semiconductor devices and having a TOC concentration of from 0.5 to 3 ppm, and the apparatus obtaining a substantially pure water having a TOC concentration of not more than 1 ppb, the apparatus comprising:

a first treating system comprising at east one reverse osmosis membrane means for transforming a low-concentration organic effluent having a TOC concentration of from 0.5 to 3 ppm into a low-concentration organic effluent having a TOC concentration of from 60 to 200 ppb; and a vacuum deaeration column means for admitting an inert gas at a volumetric feed flow rate in the range of from 0.001 to 1.0 based on the volume of the effluent under treatment at a vacuum degree of not more than 35 Torre; and a second treating system comprising at least a pair of low-pressure ultraviolet decomposition means for emitting an ultraviolet light of a wavelength of 184.9 nm; and an ion-exchange column wherein the low pressure ultraviolet decomposition means and the ion-exchange column are disposed sequentially in order.

2. The apparatus according to claim 1, wherein said at least one reverse osmosis membrane means comprises at least two stage reverse osmosis membrane means connected in series.

3. The apparatus according to claim 1, wherein said vacuum deaeration column means comprises a packing material, a vacuum pump for evacuating air from said vacuum deaeration column means, and means for feeding a small amount of inert gas into said vacuum deaeration column means and for manifesting a ratio of TOC removal of not less than 10%.

4. The apparatus according to claim 1, wherein said at least one reverse osmosis membrane means comprises a reverse osmosis unit for transforming a low-concentration organic waste water having a TOC concentration of from 0.5 to 3 ppm to a TOC concentration of not more than 100 ppb.

5. The apparatus according to claim 1, wherein said second treating system further comprises at least one additional pair of low-pressure ultraviolet decomposition means and said ion-exchange column connected in series.

6. An apparatus for recycling a low-concentration organic effluent, used in a process for production of semiconductor devices, having an initial TOC concentration of from 0.5 to 3 ppm, into a substantially pure water having a TOC concentration of not more than 1 ppb, the apparatus comprising:

a first reverse osmosis unit used in a process of production of semiconductor devices;

a second reverse osmosis unit connected to the first osmosis unit wherein said first and second reverse osmosis units define means for transforming a low-concentration organic effluent having a TOC concentration of from 0.5 to 3 ppm into a low-concentration organic effluent having a TOC concentration of from 60 to 2.00 ppb;

means for recycling at least a portion of treated water from the second reverse osmosis unit to the first reverse osmosis Unit;

a gas-injection type vacuum degasifier means connected to the second reverse osmosis unit for admitting an $N_2$ gas at a volumetric feed flow rate in the range of from 0.03 to 1.0 based on a volume of effluent at a vacuum degree of not more than 35 Torrs;

at least one low pressure ultraviolet irradiating unit connected to the gasinjection type vacuum degasifier means; and at least one mixed-bed type ion-exchange column connected to the at least one low pressure ultraviolet irradiating unit.

7. The apparatus as set forth in claim 6, wherein said at least one low pressure ultra-violet irradiating unit comprises a first low-pressure ultraviolet irradiating unit and a second low pressure ultraviolet irradiating unit; and said at least one mixed-bed type ion-exchange column comprises a first mixed-bed type ion-exchange column and a second mixed-bed type ion-exchange column.

8. The apparatus as set forth in claim 7, wherein said second low-pressure ultraviolet irradiating unit is connected to said first mixed-bed type ion-exchange column; and said second mixed-bed type ion-exchange column is connected to said second low-pressure ultraviolet irradiating unit.

9. The apparatus as set forth in claim 6, wherein said at least one low-pressure ultraviolet irradiating unit is one low-pressure ultraviolet irradiating unit, and at least one mixed-bed type ion-exchange column is one mixed-bed type ion-exchange column, wherein the one mixed-bed type ion-exchange column is connected to the one low pressure ultraviolet irradiating unit.

* * * * *